United States Patent [19]
Sugiyama

[11] Patent Number: 6,032,431
[45] Date of Patent: Mar. 7, 2000

[54] DEVICE FOR FORMING FRAMEWORK OF WOODEN BUILDING

[75] Inventor: Kazuo Sugiyama, Hiroshima, Japan

[73] Assignee: West Company Limited, Hiroshima-ken, Japan

[21] Appl. No.: 08/965,872

[22] Filed: Nov. 7, 1997

[30] Foreign Application Priority Data

Nov. 15, 1996 [JP] Japan .................................. 8-320725

[51] Int. Cl.⁷ ...................................................... E04C 2/38
[52] U.S. Cl. .................... 52/656.9; 52/655.1; 52/721.2; 52/653.1; 52/263; 52/665; 403/258; 403/260; 403/407.1; 403/230; 403/233
[58] Field of Search .................... 403/307, 300, 403/230, 233, 234, 258, 260, 407.1; 52/656.9, 263, 653.1, 655.1, 656.1, 656.2, 702, 704

[56] References Cited

U.S. PATENT DOCUMENTS

| | | |
|---|---|---|
| 65,970 | 6/1867 | Wardwell . |
| 832,133 | 10/1906 | Lanz . |
| 1,245,537 | 11/1917 | Van Fleet . |
| 2,106,084 | 1/1938 | Coddington ........................ 52/655.1 X |
| 3,429,092 | 2/1969 | Perry et al. ........................ 52/655.1 X |
| 3,817,005 | 6/1974 | Rannefeld . |
| 3,820,293 | 6/1974 | Ohe et al. .............................. 52/263 X |
| 4,068,332 | 1/1978 | Ball et al. . |
| 4,261,155 | 4/1981 | Gilb ......................................... 52/702 |
| 4,558,968 | 12/1985 | Meickl . |
| 5,044,137 | 9/1991 | Shigeru et al. . |
| 5,062,733 | 11/1991 | Cholid et al. . |
| 5,242,239 | 9/1993 | Hosokawa . |
| 5,253,945 | 10/1993 | Hosokawa . |
| 5,284,311 | 2/1994 | Baer . |
| 5,295,754 | 3/1994 | Kato . |
| 5,342,138 | 8/1994 | Saito et al. . |
| 5,438,811 | 8/1995 | Goya .................................... 403/230 X |
| 5,469,678 | 11/1995 | Zamerousky ........................ 403/230 X |
| 5,577,856 | 11/1996 | Tezuka . |
| 5,727,358 | 3/1998 | Hayashi et al. . |

FOREIGN PATENT DOCUMENTS 2 647 861   12/1990   France .
619 216    3/1961   Italy .

Primary Examiner—Christopher T. Kent
Assistant Examiner—Yvonne Horton-Richardson
Attorney, Agent, or Firm—Flynn, Thiel Boutell & Tanis, P.C.

[57] ABSTRACT

A device for forming a framework of a wooden building including a steel pipe, screw bar, joint, bolt and joint stick. The steel pipe is tightly inserted in a hole formed at the top edge and/or the bottom edge of a vertical post. The screw bar connects two vertical posts in series as an upper half thereof is screwed into a screw hole of a steel pipe inserted into the bottom edge of a vertical post, while a lower half thereof is screwed into a screw hole of a steel pipe inserted into the top edge of a vertical post positioned below the former vertical post. The joint comprises a base portion and a flange portion oriented at a right angle with respect to the from base portion. The bolt passes through a hole of the base portion of the joint and a hole of the vertical post and is screwed into a screw hole of the steel pipe to secure the joint to the vertical post. The joint stick is tightly inserted into holes of transverse member and the flange portion of the joint, joining the transverse member with the joint and thus with the vertical post.

8 Claims, 8 Drawing Sheets

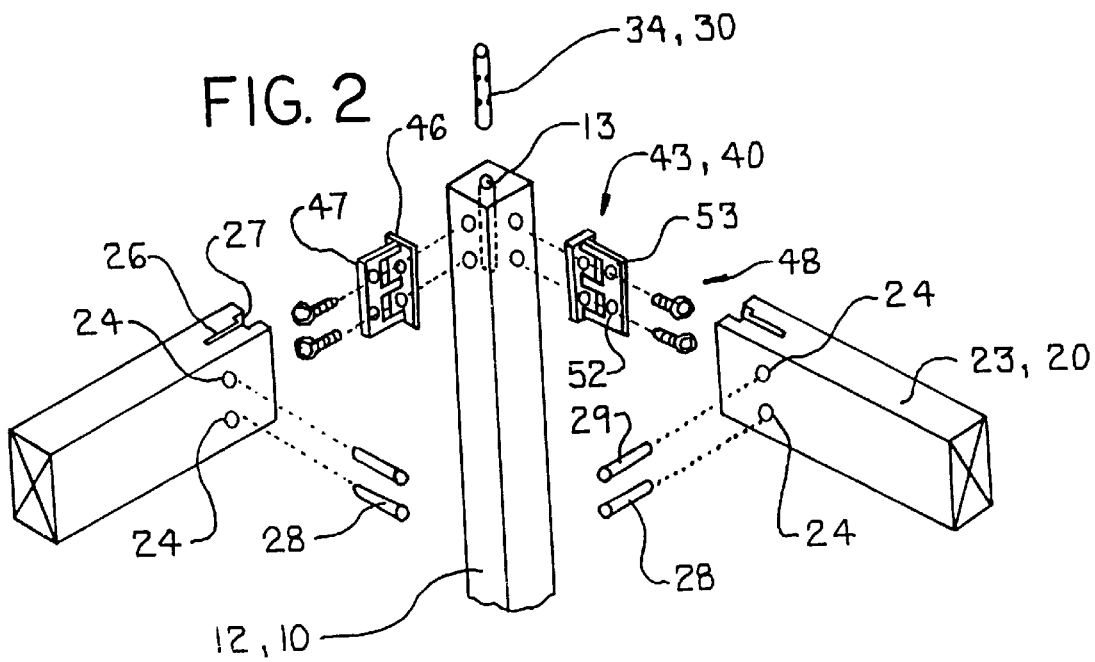
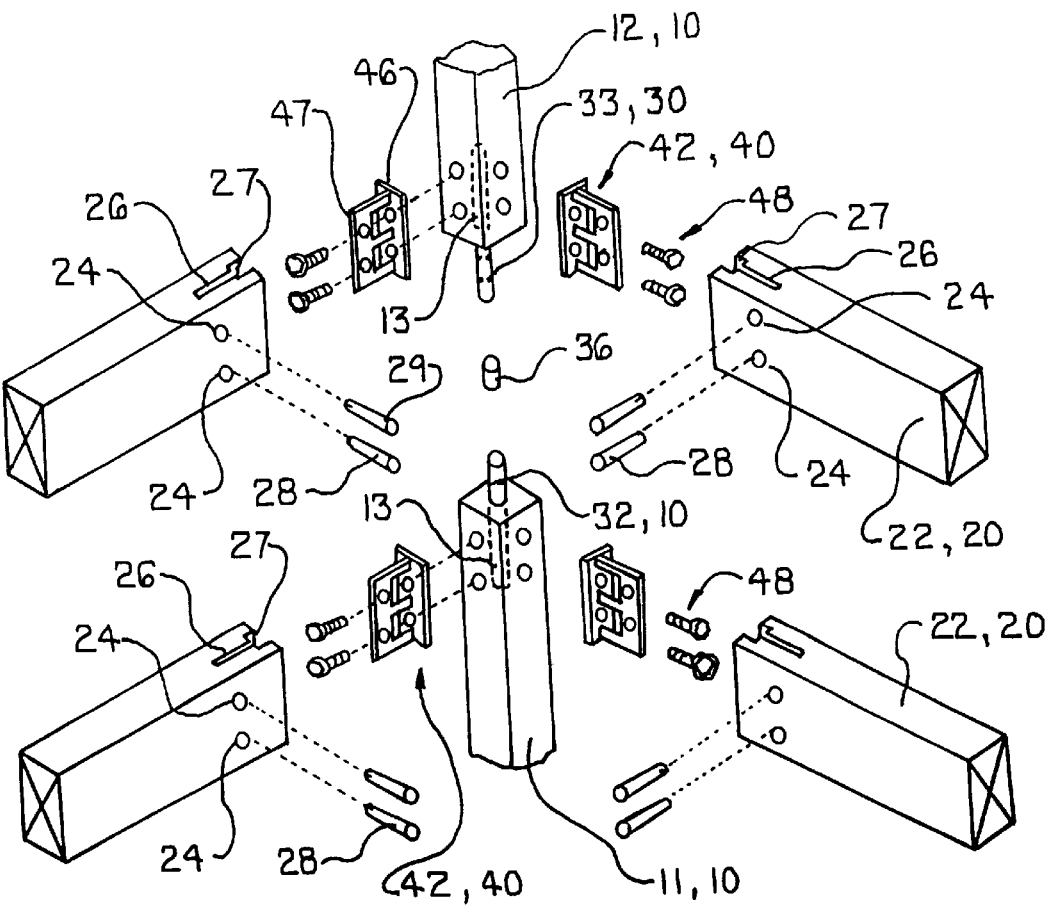

DEVICE FOR FORMING FRAMEWORK OF WOODEN BUILDING

BACKGROUND OF THE INVENTION

FIELD OF THE INVENTION

The present invention relates to an improved device for forming a framework composed of a vertically positioned wooden post (hereinafter referred to as "a vertical post") and a lumber or member transversely positioned against the vertical post (hereinafter referred to as "a transverse lumber") in a wooden building.

Conventionally, there exists a device comprising a steel belt or a steel bar as a means for easy and smooth forming of a framework of a wooden building. The framework comprises a vertical post and a transverse lumber including such as a ground still and a beam. The conventional device penetrates the vertical post in the transverse direction in order to join the vertical post with the transverse lumber.

However, there is a drawback in the conventional device. That is, the framework formed by the conventional device tends to lack a mechanical strength since the vertical post is substantially cut in order to allow the device to penetrate the vertical post.

SUMMARY OF THE INVENTION

In view of the foregoing, an object of the present invention is to provide an improved device for forming a framework composed of a vertical post and a transverse lumber, which does not require a substantial cut on the vertical post.

The present invention will be described hereinafter. A device for forming a framework of a wooden building according to the present invention comprises a steel pipe, screw bar, joint, bolt and joint stick.

The steel pipe is tightly inserted in a hole having a bottom wall formed at the top and bottom edges of a vertical post along its center line. The screw bar is such that its upper half portion is screwed into a screw hole formed at the mouth portion of a steel pipe inserted into the bottom edge of a vertical post, while its lower half is screwed into a screw hole formed at the mouth portion of a steel pipe inserted into the top edge of a vertical post positioned underneath the aforementioned vertical post. The screw bar connects the steel pipes and thus the vertical posts in series.

The joint comprises a belt-shape base portion which is located along the vertical post in the vertical direction, and a flange portion which is oriented at a right angle from the base portion. The bolt passes through a hole of the base portion of the joint and a hole of the vertical post, and the bolt is screwed into a screw hole of the steel pipe, securing the joint to the vertical post. The screw hole of the steel pipe is formed along the radial direction of the steel pipe.

The joint stick is inserted into holes of the transverse lumber and the flange portion, joining the transverse lumber with the flange portion of the joint. The joint is inserted in the slit formed at the edge portion of the transverse lumber.

According to the present invention, there is provided an improved device for forming a framework composed of a vertical post and a transverse lumber, which does not require a substantial cut on the vertical post.

Further, it is possible to improve the yield in forming a framework of a wooden building since vertical posts and transverse lumbers can be prepared in a factory and easily formed at each construction field or site.

A device according to the present invention includes a screw bar and a bolt which can firmly connect a transverse lumber to a vertical post due to the fact that a vertical post and a transverse lumber are both made of wood, and the wood is elastically deformed like a washer which acts to prevent looseness. The transverse lumber includes a ground still, girth and tie beam.

BRIEF DESCRIPTION OF THE DRAWINGS

FIG. 2 is a exploded perspective view illustrating dimension "A" in FIG. 1 and members of a device in a first embodiment according to the present invention;

FIG. 3 is a exploded perspective view illustrating dimension "B" in FIG. 1 and members of a device in the first embodiment according to the present invention;

DETAILED DESCRIPTION OF THE PREFERRED EMBODIMENT

Figure 1:
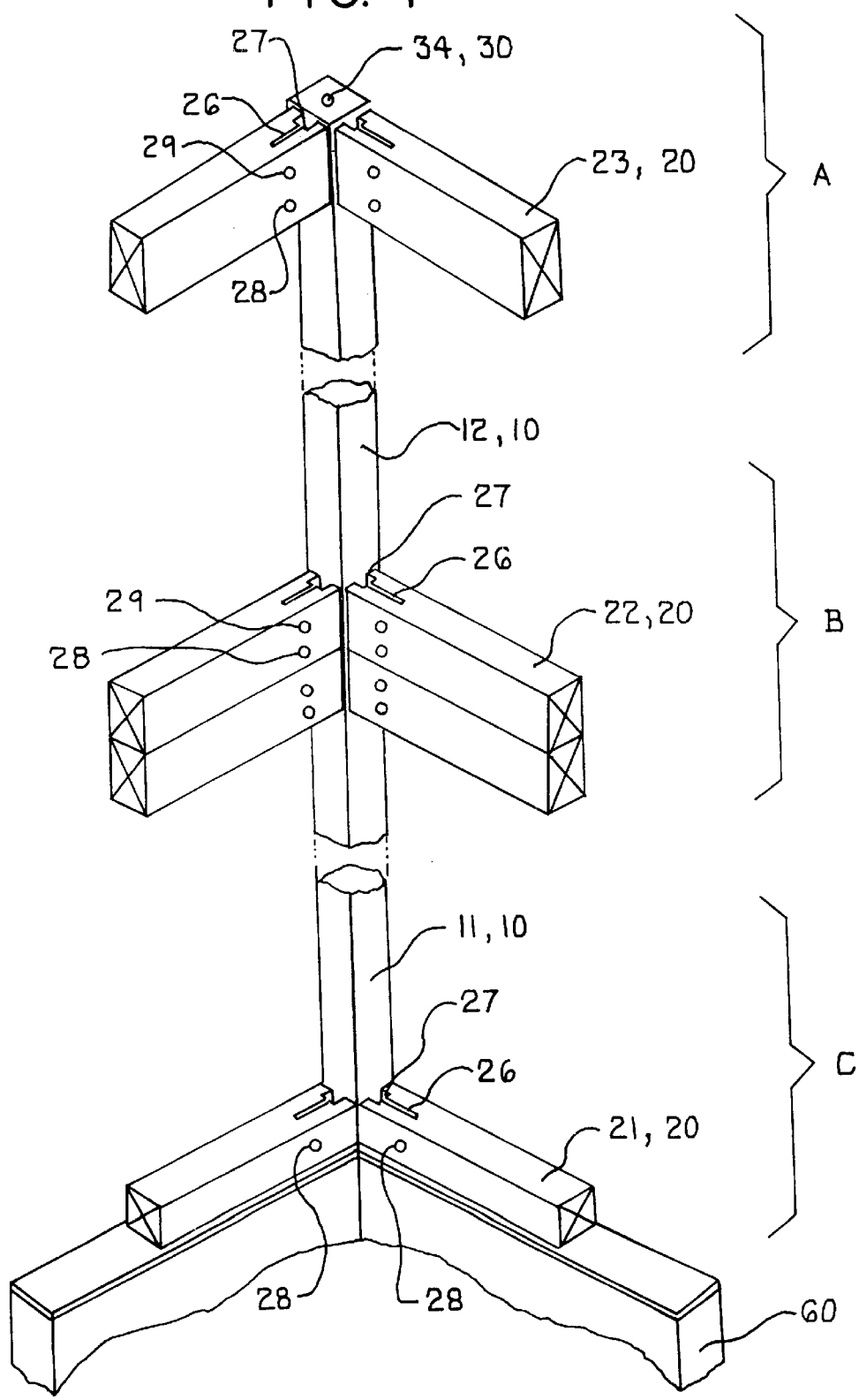
FIG. 1 is a schematic perspective view illustrating a framework of a wooden building constructed through use of a device according to the present invention.

An embodiment of the present invention will now be described in detail referring to FIG. 1 to FIG. 8. In this embodiment, as particularly illustrated in FIG. 4, a stud bolt 61 is firmly stood from a footing 60 in the vertical direction.

The stud bolt 61 is screwed into a steel pipe or tubular 31 which is firmly inserted into the bottom edge of a first-floor post 11. The steel pipe 31 is also represented by "the steel pipe 30", and the first-floor post 11 is also represented by "the vertical post 10" in the specification and drawings.

Figure 4:
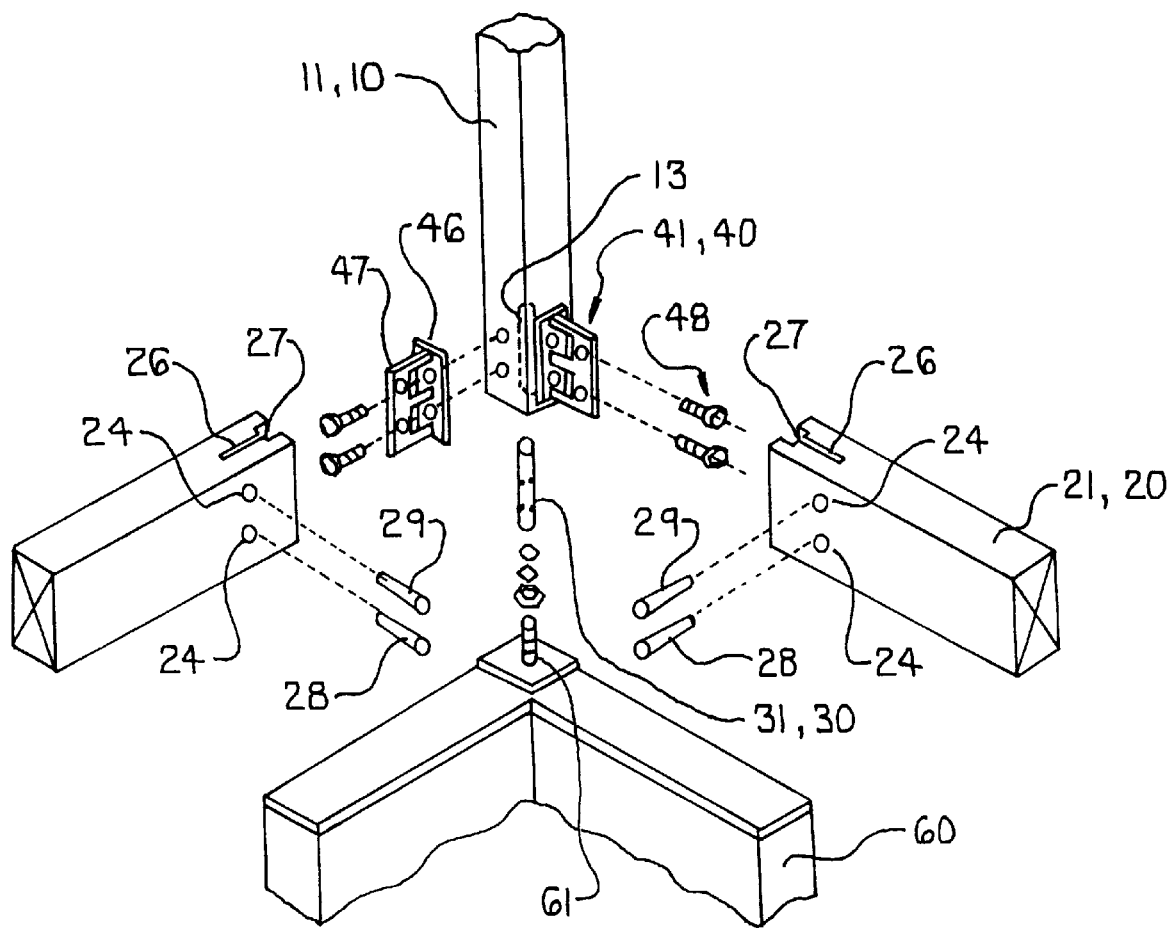
FIG. 4 is a exploded perspective view illustrating dimension "C" in FIG. 1 and members of a device in the first embodiment according to the present invention.
Figure 6:
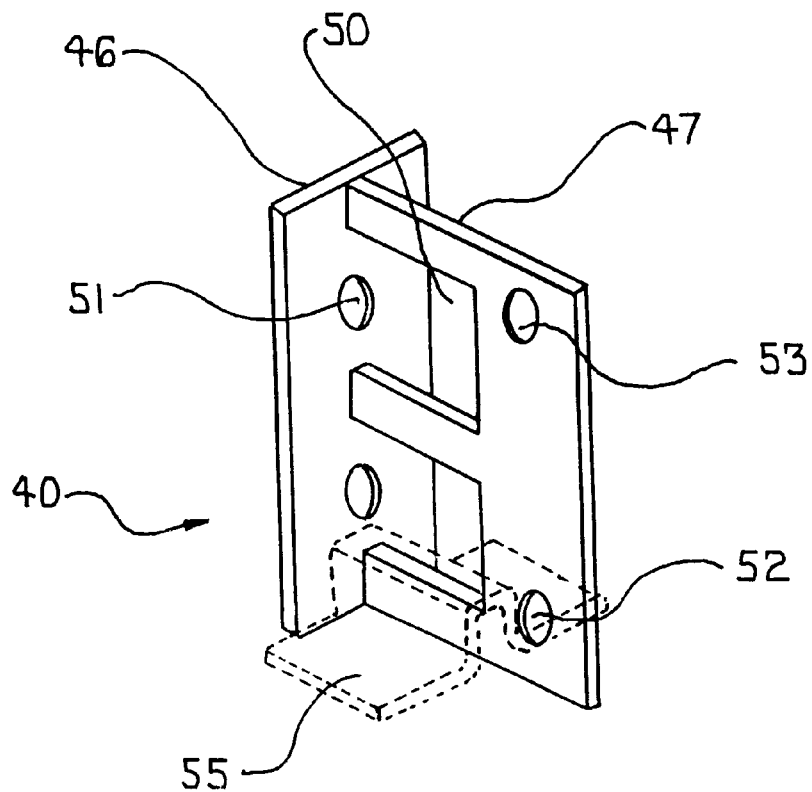
FIG. 6 is an enlarged perspective view illustrating a joint illustrated in FIG. 2 to FIG. 4.

As specifically illustrated in FIG. 6, a lower joint 41, which is also represented by "a joint 40", is composed of a generally flat base portion 46 and a flange portion 47. The base portion 46 is positioned against a vertical post 10 in the vertical direction. The flange portion 47 projects from the base portion 46 along the center line thereof. The flange portion 47 is provided with two openings 50 at its base adjacent to the base portion 46. The base portion 46 is provided with two holes 51 for allowing bolts 48 to pass through. Each hole 51 is positioned adjacent a corresponding opening 50. As illustrated in FIG. 4, the lower joint 41 is secured to the first-floor post 11 such that each bolt 48 is passed through a corresponding hole 51 of the joint 40 and a hole at the lower portion of the post 11, and the bolt 48 is screwed into a corresponding screw hole 37 formed in the circumferential wall of a steel pipe 31.

There is provided a slit 26 at the edge surface of a ground still 21, which is also represented by "a transverse lumber 20", in the circumferential the flange portion 47 of the lower joint 41. There is also provided a groove 27 at the edge surface of the ground still 21 to prevent occurrence of an interference between the edge surface of the ground still 21 and the bolt 48, particularly the bolt head.

The ground still 21 is secured to the first-floor post 11 in the following manner: First, the flange portion 47 of the joint 41 is inserted into the slit 26 of the ground still 21; subsequently, the ground still 21 is brought into contact with the first-floor post 11 at its edge surface; and finally, each joint stick 28, 29 is firmly inserted into a corresponding horizontal hole 24 formed through the ground still 21 and the hole 52 of the flange 47 in this sequence.

As illustrated in FIG. 3, a middle joint 42, which is also represented by "a joint 40", is secured to the top portion of the first-floor post 11 such that each bolt 48 is passed through a corresponding hole 51 of the base portion 46 and a hole formed at the upper portion of the first-floor post 11 in this sequence. Subsequently, each bolt 48 is screwed into a corresponding screw hole 37 of a middle steel pipe 33, which is also represented by "a steel pipe 30". Following the above-mentioned process, a girth 22, which is also represented by "a transverse lumber 20", is secured to a middle joint 42 with joint sticks 28, 29 in a manner similar to the manner in which the ground still 21 is secured to the lower joint 41. Each of the joint or elongate fasteners 28, 29 may be in the form of a pin or a bolt.

Figure 5:
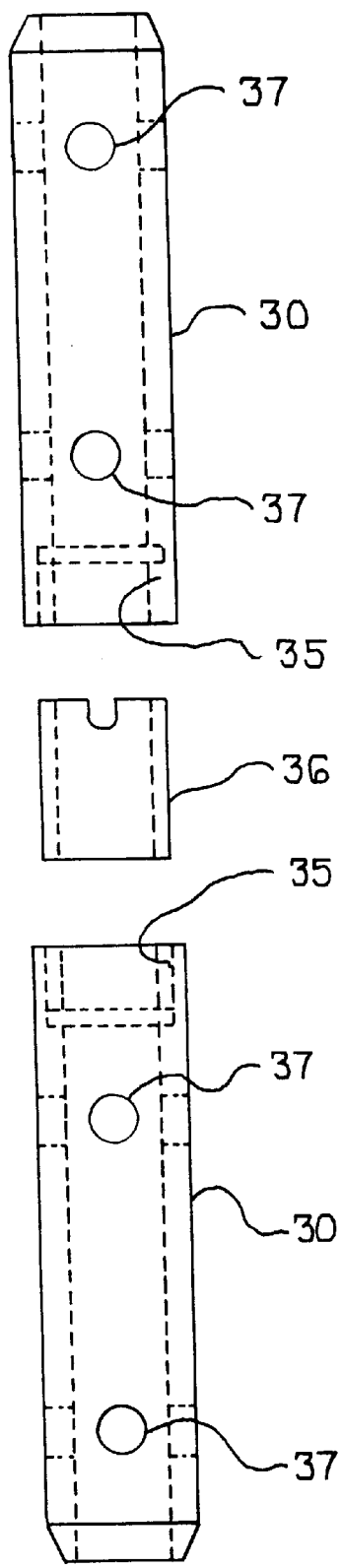
FIG. 5 is an enlarged view illustrating steel pipes and a screw bar of a device in the first embodiment according to the present invention.

As illustrated in FIGS. 3 and 5, the first-floor post 11 is connected to a second-floor post 12, which is also represented by "a vertical post 10", in the following manner. First, a screw bar or threaded fastner 36 is screwed into a screw hole 35 formed at the upper inner surface of the steel pipe 32 which is firmly inserted into the upper portion of the first-floor post 11. Upon completion of this process, the upper half of the screw bar 36 projects from the first-floor post 11 for receiving the second-floor post 12. Subsequently, a steel pipe 33 firmly inserted into the bottom portion of the second-floor post 12, which is also represented by "a steel pipe 30", is screwed to the upper half of the screw bar 36 projecting from the top of the first-floor post 11, connecting the first-floor post 11 to the second-floor post 12. Following completion of this connection between two vertical posts 11, 12, an upper joint 43, which is also represented by "a joint 40", is secured to the upper portion of the second-floor post 12 in the same manner as the middle joint 42 is secured. Finally, a tie beam 23, which is also represented by "a transverse lumber 20", is secured to the upper joint 43, thus securing the tie beam 23 to the upper portion of the second-floor post 12.

Figure 7:
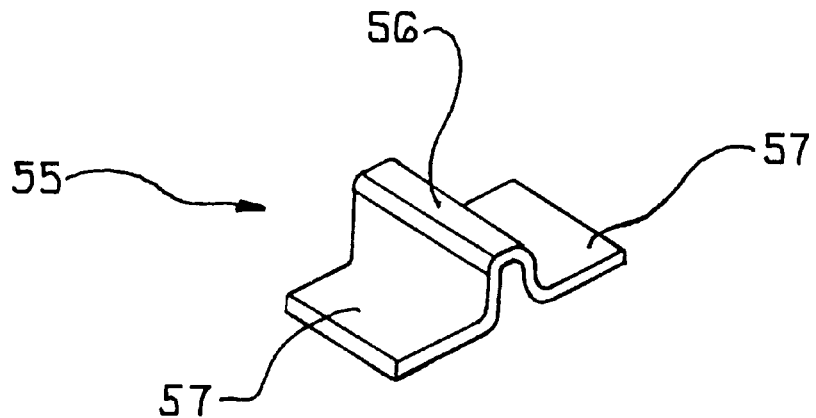
FIG. 7 is a perspective view illustrating a supporter illustrated with a dotted line in FIG. 6.
Figure 8:
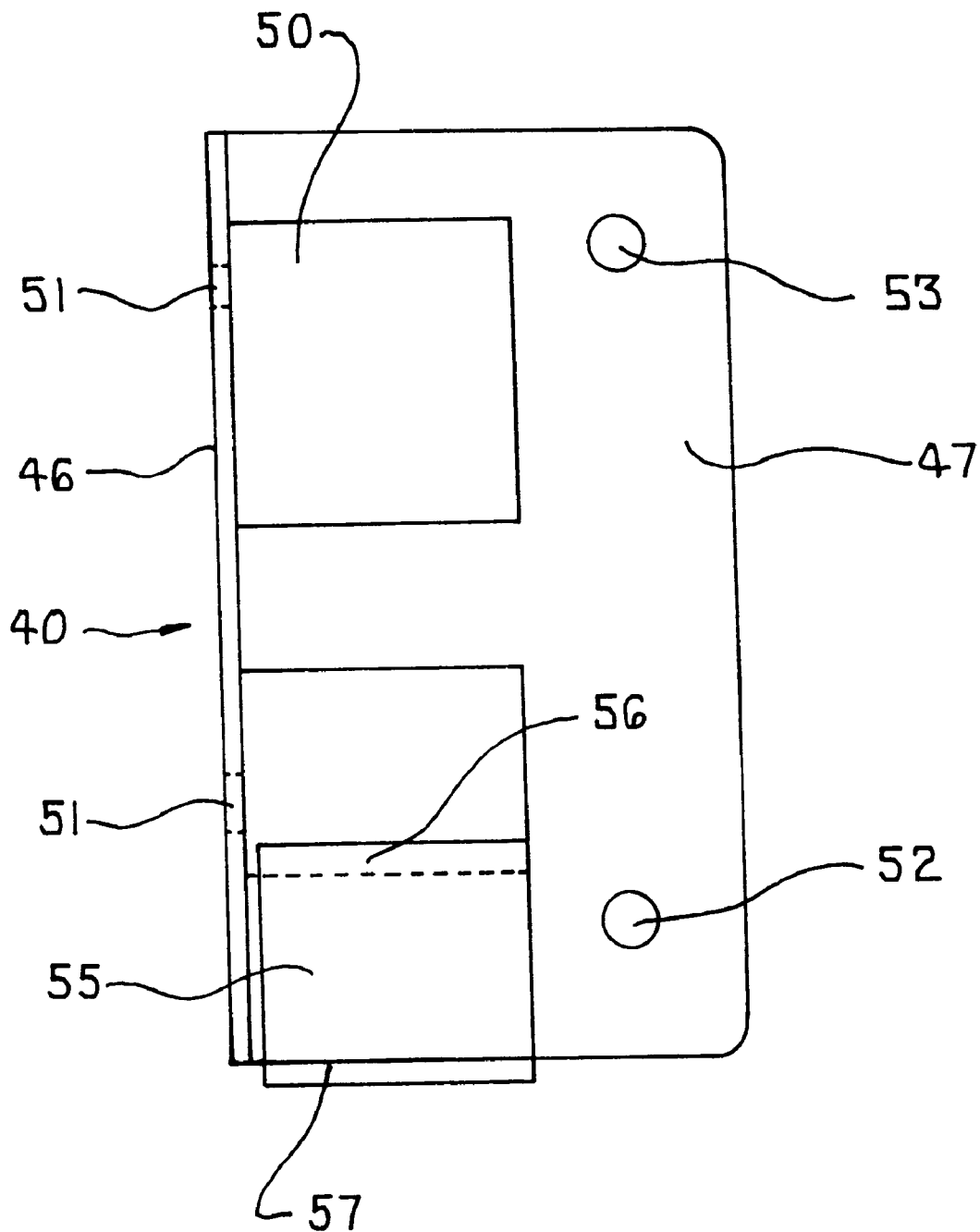
FIG. 8 is a side view illustrating a joint illustrated in FIG. 6.
Figure 9:
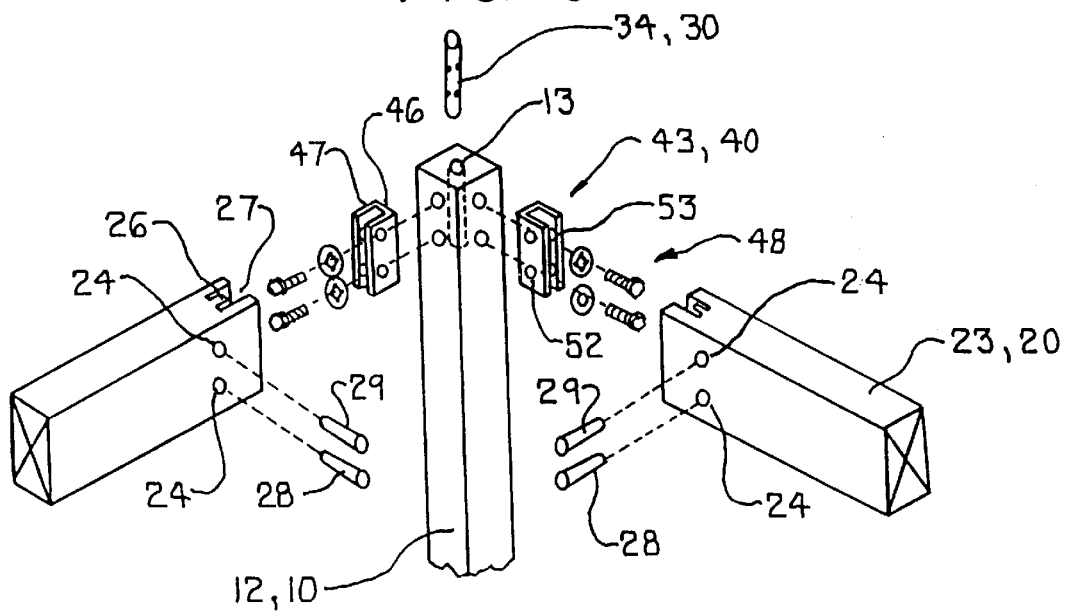
FIG. 9 is a exploded perspective view illustrating dimension "A" in FIG. 1 and members of a device in a second embodiment according to the present invention.
Figure 10:
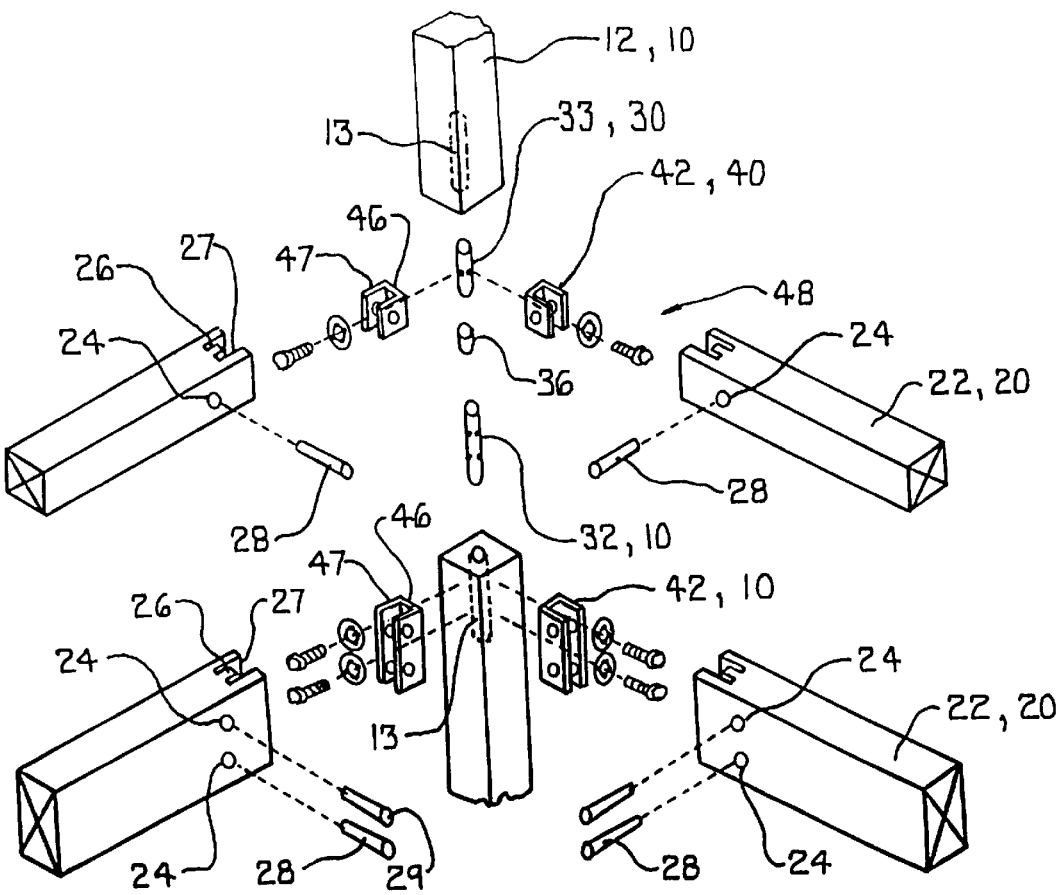
FIG. 10 is a exploded perspective view illustrating dimension "B" in FIG. 1 and members of a device in the second embodiment according to the present invention.
Figure 11:
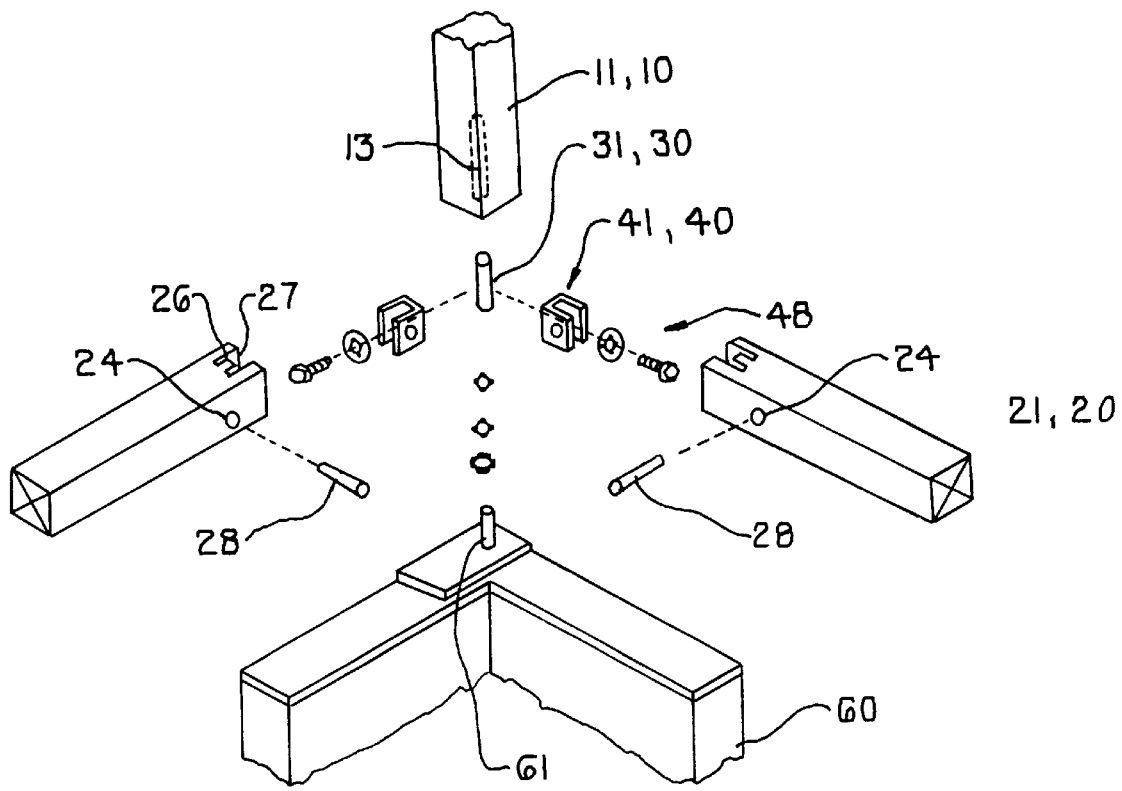
FIG. 11 is a exploded perspective view illustrating dimension "C" in FIG. 1 and members of a device in the second embodiment according to the present invention.

A joint 40 may be provided with two flange portions 47, 47 as illustrated in FIG. 9 to FIG. 11, in place of a single flange portion 47 as illustrated in FIG. 1 to FIG. 8.

Figure 12:
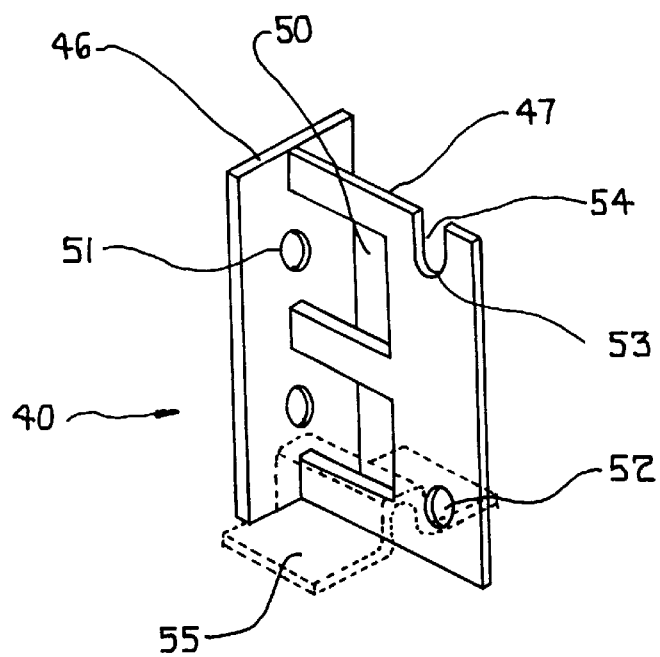
FIG. 12 is an enlarged perspective view illustrating a joint having a notch according to the present invention.

There may be provided a notch 54 above the upper hole 53 of the flange portion 47 of the joint 40 as illustrated in FIG. 12. Such joint 40 may be used in place of a joint 40 having two holes 52, 53 as illustrated in FIG. 6 and FIG. 8. The notch 54 makes a larger notch at the upper edge of the flange portion 47 in combination with the upper hole 53. By applying a joint 40 having a notch 54, a transverse lumber 20 can easily be secured to the joint 40. That is, a joint stick 29 is inserted into an upper hole 24 of the transverse lumber 20 prior to adjustment of the transverse lumber 20 with respect to the joint 40 for secure connection. When the transverse lumber 20 is secured to the joint 40, the joint stick 29 previously inserted into the hole 24 is placed in the hole 53 through the notch 54. Upon completion of this process, the traverse lumber 20 is supported by collaboration of the joint stick 29 and the hole 53. Thus, the lumber 20 does not fall even if it is not supported by hands. A joint stick 28 is inserted into a lower hole 52 while the transverse lumber 20 is supported by the joint stick 29 and the hole 53.

Further, as illustrated in FIG. 6 to FIG. 8, there may be provided a supporter 55 which comprises a reversed-U shape portion 56 and wings 57, 57. Each wing 57 extends from the edge of the reversed-U shape portion 56 in the horizontal direction. When a transverse lumber 20 is secured to a joint 40, this supporter 55 is placed at a lower opening 50. Each of the joint sticks 28, 29 is inserted into a corresponding hole 52, 53 while a girth 22 or a tie beam 23 is placed on and supported by the wings 57 of the supporter 55.

The present invention is not limited to the above-described embodiment. The above-mentioned embodiment is a mere example, and those being substantially the same as described in the appended claims and providing similar action and effects are included in the scope of the present invention.

What is claimed is:

1. A device for forming a framework of a wooden building comprising:

a first tubular member which is tightly inserted in a hole formed at a bottom edge of a first vertical post, said hole being located along a vertical center line of said first vertical post;

a first fastener having an upper half portion screwed into a screw hole formed at a mouth portion of the first tubular member, the first fastener having a lower half portion screwed into a screw hole formed at a mouth portion of a second tubular member which is inserted into a top edge of a second vertical post positioned below the first vertical post for connecting the first and second tubular members and thus the first and second vertical posts in series;

a joint including a generally flat base portion positioned along at least one of the first and second vertical posts in the vertical direction, and a flange portion oriented at a right angle from a vertical center line of the base portion, both the base portion and the flange portion having a hole therein;

a bolt which extends through the hole of the base portion of the joint and a hole of said one first and second vertical post and is screwed into a screw hole of a corresponding one of the first and second tubular members for securing the joint to said one first and second vertical post, said screw hole of said one first and second tubular member being formed radially therein; and a second elongate fastener which is tightly inserted into a hole of a transverse member and the hole of the flange portion of the joint to interconnect the transverse member with the joint and thus with said one first and second vertical post, said flange portion being inserted into a slit formed at an edge portion of the transverse member.

2. A device for forming a framework of a wooden building claimed in claim 1, further including a supporter comprising a reversed-U shape portion and wings, each wing extending in a generally horizontal direction from a respective edge of the reversed-U shape portion, the supporter being hooked in a hole of the joint and supporting the transverse member from underneath while the transverse member is connected to said one first and second vertical post.

3. A device for forming a framework of a wooden building claimed in claim 1, wherein the hole of the flange portion is disposed adjacent a bottom edge thereof and said flange portion has an upwardly opening notch at a top edge thereof, and a third elongate fastener is tightly inserted into an additional hole in the transverse member and the notch of the flange portion.

4. A device for forming a framework of a wooden building claimed in claim 3, further including a supporter comprising a reversed-U shape portion and wings, each wing extending in a generally horizontal direction from a respective edge of the reversed-U shape portion, the supporter being hooked in a hole of the joint and supporting the transverse member from underneath while the transverse member is connected to said one first and second vertical post.

5. A device for forming a framework of a wooden building comprising:

a first tubular member which is tightly inserted in a hole formed at a bottom edge of a first vertical post, said hole being located along a vertical center line of said first vertical post;

a first fastener having an upper half portion screwed into a screw hole formed at a mouth portion of the first tubular member, the first fastener having a lower half portion screwed into a screw hole formed at a mouth portion of a second tubular member which is inserted into a top edge of a second vertical post positioned below the first vertical post for connecting the first and second tubular members and thus the first and second vertical posts in series;

a joint including a generally flat base portion positioned along at least one of the first and second vertical posts in the vertical direction, and a pair of flange portions each oriented at a right angle from a respective side edge of the base portion, both the base portion and each of the flange portions having a hole therein;

a bolt which extends through the hole of the base portion of the joint and a hole of said one first and second vertical post and is screwed into a screw hole of a corresponding one of the first and second tubular members for securing the joint to said one first and second vertical post, said screw hole of said one first and second tubular member being formed radially therein; and a second elongate fastener which is tightly inserted into a hole of a transverse member and the hole of each flange portion of the joint to interconnect the transverse member with the joint and thus with said one first and second vertical post, said flange portions being inserted into corresponding slits formed at an edge portion of the transverse member.

6. A device for forming a framework of a wooden building claimed in claim 5, further including a supporter comprising a reversed-U shape portion and wings, each wing extending in a generally horizontal direction from a respective edge of the reversed-U shape portion, the supporter being hooked in a hole of the joint and supporting the transverse member from underneath while the transverse member is connected to said one first and second vertical post.

7. A device for forming a framework of a wooden building comprising:

a first tubular member which is tightly inserted in a hole formed at a bottom edge of a first vertical post, said hole being located along a center line of said first vertical post;

a first fastener having an upper half portion screwed into a screw hole formed at a mouth portion of the first tubular member, the first fastener having a lower half portion screwed into a screw hole formed at a mouth portion of a second tubular member which is inserted into a top edge of a second vertical post positioned below the first vertical post for connecting the first and second tubular members and thus the first and second vertical posts in series;

a joint including a generally flat base portion positioned along at least one of the first and second vertical posts in the vertical direction, and a pair of flange portions each oriented at a right angle from a respective side edge of the base portion, the base portion having a hole therein and each flange portion having an upwardly opening notch at a top edge thereof;

a bolt which extends through the hole of the base portion of the joint and a hole of said one first and second vertical post and which is screwed into a screw hole of a corresponding one of the first and second tubular members for securing the joint to said one first and second vertical post, said screw hole of said one first and second tubular member being formed radially therein; and a second elongate fastener which is tightly inserted into a hole of a transverse member and the respective notches of the flange portions of the joint to interconnect the transverse member with the joint and thus with said one first and second vertical post, said flange portions being inserted into corresponding slits formed at an edge portion of the transverse member.

8. A device for forming a framework of a wooden building claimed in claim 7, further including a supporter, the supporter comprising a reversed-U shape portion and wings, each wing extending in a generally horizontal direction from a respective edge of the reversed-U shape portion, the supporter being hooked in a hole of the joint and supporting the transverse member from underneath while the transverse member is connected to said one first and second vertical post.

* * * * *